United States Patent
Katayanagi et al.

(10) Patent No.: US 6,321,983 B1
(45) Date of Patent: Nov. 27, 2001

(54) METHOD FOR MANAGING LIFE CYCLES AND SYSTEM FOR THE SAME

(75) Inventors: Takahiro Katayanagi, Cyofu; Katsufumi Mihara; Naoki Takahashi, both of Yokohama; Akira Ishibashi, Bunkyo-ku; Shuji Soga, Kawasaki; Tetsuo Kusuzaki, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/360,687

(22) Filed: Jul. 26, 1999

(30) Foreign Application Priority Data

Jul. 27, 1998 (JP) .................................. 10-211318

(51) Int. Cl.[7] .............................. G06K 5/00; G06K 17/00
(52) U.S. Cl. ........................ 235/380; 235/375; 235/376
(58) Field of Search .................................... 235/380, 381, 235/383, 385, 375, 376

(56) References Cited

U.S. PATENT DOCUMENTS

| | | | |
|---|---|---|---|
| 4,667,291 | * | 5/1987 | Weitzman et al. .................. 235/383 |
| 4,961,507 | * | 10/1990 | Higgins ............................... 235/381 |
| 5,374,813 | * | 12/1994 | Shipp .................................. 235/375 |
| 5,532,928 | * | 7/1996 | Stanczyk et al. .................... 235/376 |
| 5,699,525 | * | 12/1997 | Embutsu et al. ..................... 235/385 |
| 5,965,858 | * | 10/1999 | Suzuki et al. ....................... 235/275 |

FOREIGN PATENT DOCUMENTS

| | | |
|---|---|---|
| 6-168253 | 6/1994 | (JP) . |
| 7-160325 | 6/1995 | (JP) . |
| 8-277020 | 10/1996 | (JP) . |
| 9-155327 | 6/1997 | (JP) . |
| 10057936 A | * 3/1998 | (JP) . |

* cited by examiner

*Primary Examiner*—Karl D. Frech
*Assistant Examiner*—Uchau Le
(74) *Attorney, Agent, or Firm*—Mattingly, Stanger & Malur, P.C.

(57) ABSTRACT

A method and system for managing the overall life cycle of a product from its manufacture to its destruction or recycling. To the product is affixed a storage medium storing a product identifier uniquely identifying the product and information about the parts that are contained in the product. At each site that the product passes through during its life cycle, product life cycle information is recorded in the storage medium affixed to the product. When the product is to be destroyed or recycled, the information stored in the recording medium is used to determine the method for destroying or recycling. The product is then destroyed or recycled according to this method.

17 Claims, 17 Drawing Sheets

FIG.6A

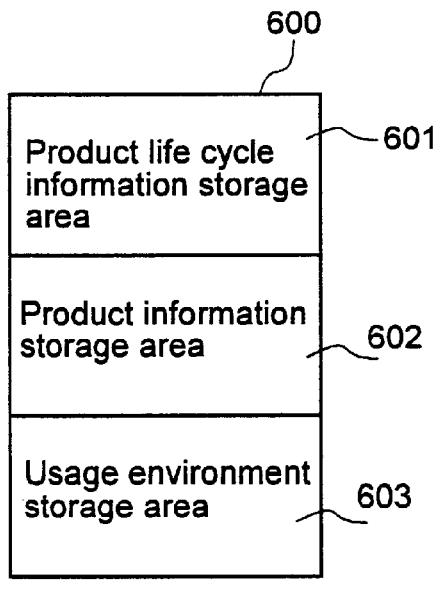

- 600
- 601 Product life cycle information storage area
- 602 Product information storage area
- 603 Usage environment storage area

FIG.6B

| Site | Contact information etc. |
|---|---|
| M0005 | Manufacturer contact information |
| H0002 | Dealer contact information |
| S0003 | Service company contact information |
| K0008 | Recycler contact information |
|  |  |

| Temperature | Number of times used (hours) |
|---|---|
| ~10°C | 200 |
| 10°C~30°C | 300 |
| 30°C~ | 100 |

632

| Voltage | Number of times used (hours) |
|---|---|
| ~90V | 300 |
| 90°C~110V | 500 |
| 110V~ | 200 |

Other usage environment data

| Product ID | | | | | | | |
|---|---|---|---|---|---|---|---|
| Part ID | Reuse | Attribute (material, weight, etc.) | Haz-ardous | Date change date | Repair/ mainte-nance history | Post-recyling disposal pro-cedure | |
| ⊢B001 | O | ABS, other, 65 | | | | | |
| ⊢B0011 | — | ABS, 60 | | | | | |
| ⊢B0012 | — | PP, 5 | | '98'07'06 | | | |
| ⊢B002 | | ABS, other, 32 | | | | | |
| ⊢B0021 | O | ABS, other, 30 | | | | | |
| ⊢B00211 | | ABS, 20 | | | | | |
| ⊢B00212 | | Composite, 10 | O | | | #101 Disposal | |
| ...... | | | | | | | |

| Product ID | Parts table | Manufacture date | shipping date | Shipping destination |
|---|---|---|---|---|
| S1234 | | '98'07'01 | '98'07'05 | A Corp. |
| S1235 | | '98'07'02 | | |

801 802 803 804 805  800

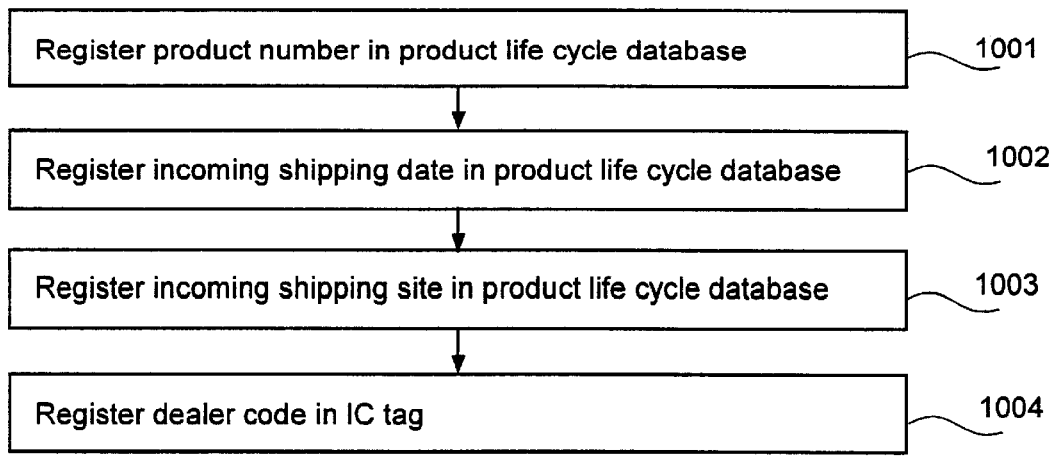
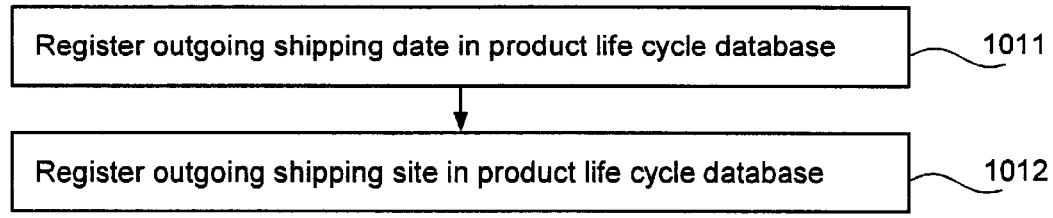

| Product ID | Service date | Maintenance history (e. g. , repair/replacement) |
|---|---|---|
| S1234 | '98'08'08 | History No 98080801 |

1501, 1502, 1503, 1500

| Disposal ID | Disposal | |
| --- | --- | --- |
| | Disposal procedure | Disposal details |
| Disposal A — A1 | Recycle | |
| — A2 — A21 | Recycle | |
|         — A22 | Destroy | High temperature incineration |
| — A3 | | |
| — A4 | Http reference | |
| ⋮ | | |

FIG.23

Balance database

| Disposal ID | Disposal Fees | | Purchase price (recyclable parts) | Difference |
|---|---|---|---|---|
| | Corp. A | Corp. B | | |
| Disposal A1 | 200 | 300 | 50 | 450 |
| Disposal A2 | — | 100 | 10 | 90 |
| …… | | | | |

METHOD FOR MANAGING LIFE CYCLES AND SYSTEM FOR THE SAME

BACKGROUND OF THE INVENTION

The present invention relates to a method for managing life cycles and system for the same. More specifically, the present invention relates to a method for managing life cycles of products by affixing electronic tags to products and a system for the same.

In the past, methods and systems for managing the disassembly of various types of products have been proposed as technologies relating to product life cycle management. For example, in Japanese laid-open patent publication number 6-168253, there is disclosed a method and system for the disassembly of products. In this technology, the product itself displays a code based on the product name, the name of the manufacturer of the product, the model number, the year the product was produced, the production number, and the like. Also, the components and the names of the materials are displayed on each of the parts that make up the product. This data is used to perform disassembly of the product. Japanese laid-open patent publication number 9-155327 discloses a disposal system in which the desirable disposable method for a discarded product is determined from information affixed to the discarded product and information from a database.

Japanese laid-open patent publication number 7-160325 discloses a method for performing maintenance of products. In this technology, a product is formed from a plurality of elements (parts). On the product is disposed storing means storing the history of each element. Maintenance is performed using this stored history information.

In Japanese laid-open patent publication number 8-277020, there is disclosed a disposal method and system that uses an IC card. The information in the IC card is used as a manifest for special industrial waste management documentation systems. Alterations to the waste disposal manifest are prevented and certified companies can be identified.

SUMMARY OF THE INVENTION

Each of the conventional technologies described above relates to disposal methods and systems used in maintaining, disassembling, and destroying products, but does not consider the overall life cycle of products or their parts. In recent years, there has been a need to deal with environmental issues and the rationalization of life cycle processes. This brings up the need to consider the overall life cycle of products from their production to their destruction or recycling. However, there has been no disposal method or system that looked at issues from this perspective.

The object of the present invention is to overcome the problems described above and to provide a method for managing life cycles and a system for the same in which the overall life cycle is managed, from the production of the product to the destruction or recycling of the product so that the evaluations and disposal procedures used when a product or parts thereof are to be recycled or discarded can be rationalized.

In order to achieve the objects described above, a desirable implementation of a life cycle management method according to the present invention, in which the life cycle of a product is managed from manufacture to destruction of the product, is as follows. First, a storage medium is affixed to the product. The storage medium contains a product identifier uniquely identifying the product and information about the parts that make up the product. At each site that the product passes through during its life cycle, product life cycle information is stored in the storage medium. When the product is to be destroyed, destruction is carried out based on information stored in the storage medium.

In order to achieve the objects described above, the present invention also provides a life cycle management system for managing the life cycle of a product from manufacture to destruction. This life cycle management system includes: a storage medium affixed to a product containing a product identifier uniquely identifying the product and information about the parts that make up the product; and a plurality of management systems installed at sites involved in the product life cycle from manufacture to destruction and, when the product passes through a site, recording information about the passage of the product through the site.

Further characteristics and advantages of the present invention will become apparent from the following description read in conjunction with the accompanying drawings.

BRIEF DESCRIPTION OF THE DRAWINGS

FIG. 6A is a memory map of a memory in an IC tag.

FIG. 6B is a drawing showing sample information stored in a product life cycle information storage area.

FIG. 6C is a drawing showing the contents of information stored in a usage environment storage area.

FIG. 7 is a drawing showing sample information stored in a product information storage area in an IC tag.

FIG. 10A is a flowchart showing the operations performed by a life cycle management system in a dealer system when an incoming product shipment takes place.

FIG. 10B is a flowchart showing the operations performed by a life cycle management system in a dealer system when an outgoing product shipment takes place.

FIG. 11 is a drawing showing sample contents of a product life cycle database in a dealer system.

FIG. 23 is a drawing showing sample contents of an accounting database.

DESCRIPTION OF THE PREFERRED EMBODIMENTS

Figure 1:
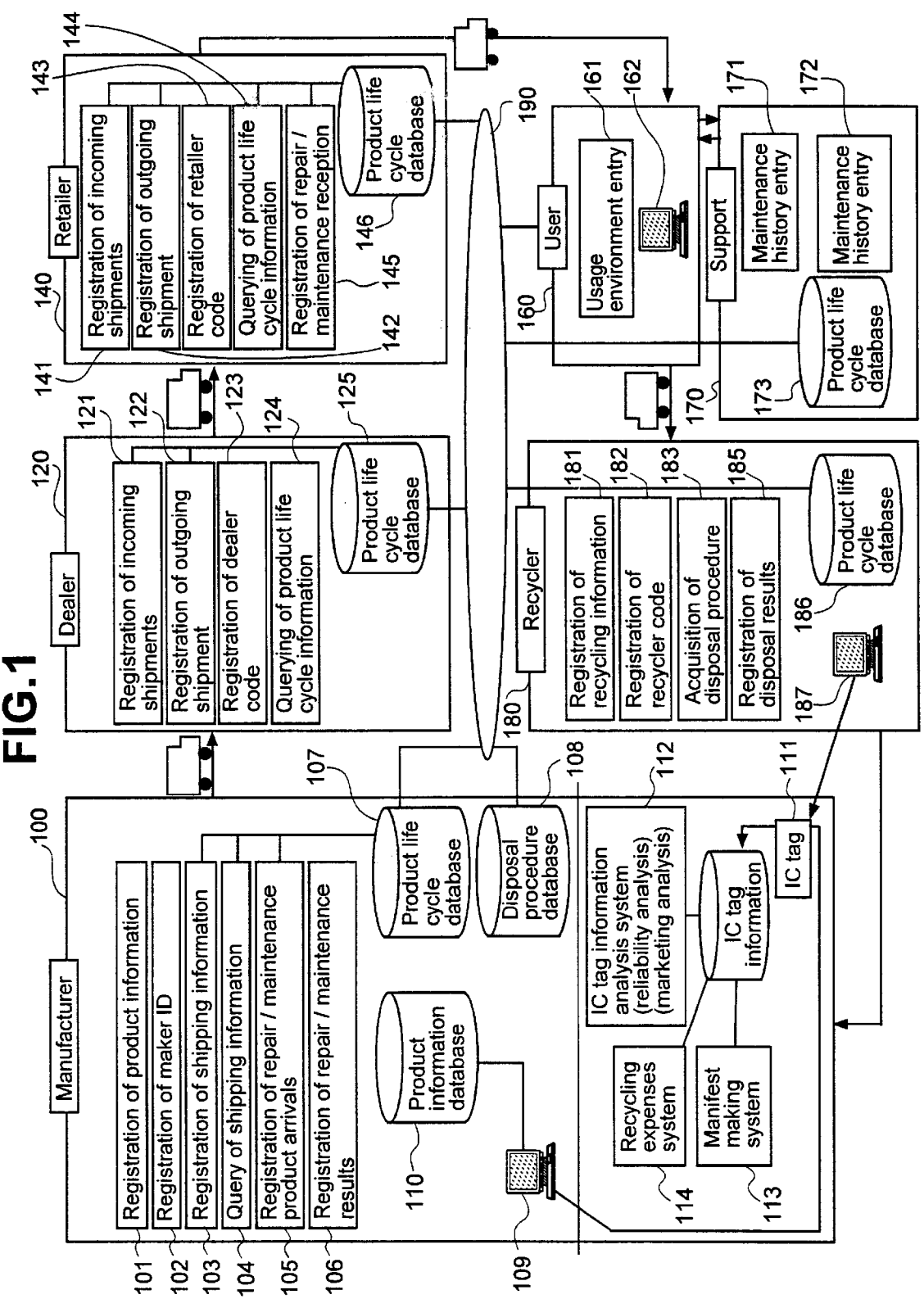
FIG. 1 is a block diagram showing the overall life cycle management system according to an embodiment of the present invention.

FIG. 1 is a block diagram showing an entire life cycle management system according to a first embodiment of the present invention. A manufacturer system 100 is the system of the manufacturer of the product for which recycling management is to be performed. A dealer system 120 is the system used by the dealer of the product. A retailer system 140 is the system used by the retailer selling the product to the general user. A user 160 purchases the product from the retailer and uses it. A service company system 170 is the system used by a service company that performs repairs and maintenance of the product being used by the user. A recycler/waste disposal company system 180 is used by a company that recovers and recycles or destroys the product.

In this embodiment, a tag is attached to the product, which goes from the manufacturer to the dealer, the retailer, the user, the service company, and the recycler/destroyer. The tag used here is a storage medium attached to the product, and is used to store various information as the product is produced, shipped, sold, used, and recycled or destroyed. More specifically, the tag can be an IC card, an opto-magnetic recording medium, a barcode label or the like that contains an IC chip as a storage element and uses a contact or a non-contact method to allow the reading and writing of data. In this embodiment, an IC card is used as the tag and the tag will be referred to as an IC tag. If a removable storage medium such as an IC card is used as the IC tag, the IC card itself can be reused, thus conserving resources and reducing total costs. Also, alteration of data can be prevented by implementing security measures that allows only accredited businesses to access the data in the IC card. The information stored in the IC tag can be used for the recycling or destruction of the product or the like.

This system uses product life cycle databases. A product life cycle database is a database holding information used to manage product life cycles and contains information similar to the information stored in IC tags as well as more detailed information. The information in the IC tag and the information in the product life cycle database are closely linked and are used in conjunction with each other. Product life cycle databases are provided in the manufacturer production management system, the dealer sales management system, the retailer sales management system, the service company service management system, and the waste disposal/recycler company management system. These product life cycles databases installed in these management systems are set up so that they can communicate with each other over a network. This allows information about a product to be shared between different companies.

The following is a detailed description of the life cycle management system shown in FIG. 1. In the manufacturer system 100, product information and a manufacturer code are entered into an IC tag attached to the product when the product is manufactured, and the information about the shipping of the product is entered in a product life cycle database 107 (a product information registration operation 101, a manufacturer registration operation 102, and a shipping information registration operation 103). In the manufacturer system 100, queries on product life cycle information can be sent to the product life cycle database 107 (a product life cycle information querying operation 104). Furthermore, in the manufacturer system 100, entries into the product life cycle database 107 are performed for incoming shipments information of repair/maintenance products (a repair/maintenance product incoming shipment registration operation 105) and repair/maintenance results information (a repair/maintenance results registration operation 106).

The products shipped out from the manufacturer are sold by a dealer. When an incoming shipment of a product is received, the dealer system 120 registers incoming shipment information into the product life cycle database 125 (an incoming shipment registration operation 121), and registers a dealer code into the IC tag of the product (a dealer code registration operation 123). When the product is shipped out, the outgoing shipment information is registered in the product life cycle database 125 (an outgoing shipment information registration operation 122). When necessary, the dealer system 120 allows product life cycle information to be queried from the product life cycle database 125 (a product life cycle information querying operation 124).

The product shipped out from the dealer is sold by a retailer to a user. When an incoming shipment of the product is received, the retailer system 140 enters the incoming shipment information into the product life cycle database 146 (an incoming shipment information registration operation 141), and enters a retailer code into the product IC tag (a retailer code registration operation 143). When the product is shipped out, the outgoing shipment information is registered in the product life cycle database 146 (an outgoing shipment information registration operation 142). When necessary, the retailer system 140 allows product life cycle information queries to be made to the product life cycle database 146 (a product life cycle information querying operation 144). Also, the retailer system 140 accepts and registers products for repairs/maintenance (a repair/maintenance reception registration operation 145).

The product (e.g., a product 162) sold by the retailer to the user is used by a user 160. During use, usage environment information, such as the number of times the product is used or the number of times the product malfunctions, is written to the IC tag (a usage environment writing operation 161).

When necessary, a service company performs repair and maintenance on a product being used by a user. When repair or maintenance of a product is performed, the service company system 170 writes the repair/maintenance history to a product life cycle database 173 (a maintenance history writing operation 172). This history is also written to the IC tag of the product (maintenance history writing operation 171).

When the product is no longer needed by the user, it is recovered by a recycling/recovery company. In the recycling/recovery company system 180, the product is recovered from the user and the recovery information is entered in the product life cycle database 186 while the company code is entered in the IC tag (a recovery information registration operation 181 and a company code registration operation 182). Also, the recycler/recovery company system 180 reads the disposal information, e.g., disassembly/destruction information, for the product (or the parts in the product) and, if necessary, obtains detailed methods of disposal from the disposal database 108 (a disposal method acquisition operation 183). When the operation is completed, the recycling/recovery company system 180 registers the results of the operation in the product life cycle database 186 (an operation results registration operation 185). The IC tag 187 is removed from the product and returned to the manufacturer.

The manufacturer reads the information stored in the recovered IC tag 111, and this is stored as an IC tag information 115. An IC tag information analysis system 112 performs reliability analysis and marketing analysis on the IC tag information 115, and the results are used in future product development and production. A recovery expenses accounting system 114 reads the IC tag information 115 and calculates the expenses relating to the operations performed by the recovery company. A manifest creation system 113 reads the IC tag information 115 and creates a manifest. A manifest is an administrative document used when destroying waste. After the IC tag information is read from the IC tag 111, it is affixed to a new product and reused. Product information from when the product is manufactured is stored in the product information database 110. If parts or the IC tag is reused, this is also recorded.

The manufacturer system 100, the dealer system 120, the retailer system 140, the service company system 170, and the recycler/recovery company system 180 are each equipped with the product life cycle database 107, 125, 146, 173, and 186, respectively. These product life cycle databases 107, 125, 146, 173, and 186 are given information more detailed than the information stored in the IC tags affixed to products. The product life cycle databases 107, 125, 146, 173, and 186 are connected to each other via a network 190 and can be accessed by the systems 100, 120, 140, 170, and 180.

In the life cycle management system shown in FIG. 1, IC tags are affixed to individual products. Various items of information used to manage product life cycle (e.g., product model, presence of recycled parts, types of parts and attributes of parts, disposal method for each part, sales route, repair/maintenance history) are stored in the IC tag. Thus, no matter what stage in its life cycle a product is in, information such as the product model, sales route, and the maintenance history can be determined for each individual product by referring to the information stored in the IC tag. Since maintenance history such as malfunctions and replacement of parts is appended to the IC tag of each product, the history of each individual product can be determined. The information stored in the IC tag can also be used to determine when and where products were shipped out or received. This facilitates inventory, product tracking, and product recall operations. For each individual product, the presence of recycled parts (reused parts) as well as the part types can be stored in the IC tag so that this information can be referred to during maintenance. This also makes it easier to determine if a part can be reused after disassembly. If a malfunction takes place when a product is being used, this information can be written to the IC tag to make troubleshooting easier. Also, this type of information can be used as field data for assessing the reliability of devices and parts. Furthermore, the product life cycle information in the IC tag can allow on-site operating conditions to be judged by product or by part, and on-site reliability can be analyzed. Also, disposal status for disassembly, destruction, recycling, and the like (e.g., location, date and time, name of the company, quantity) can be accessed in real time. In the disposal stage when disassembly, destruction, recycling are to take place, a manifest can be automatically generated by reading the necessary data from the IC tag or by collecting the necessary data from the product life cycle database.

Figure 2:
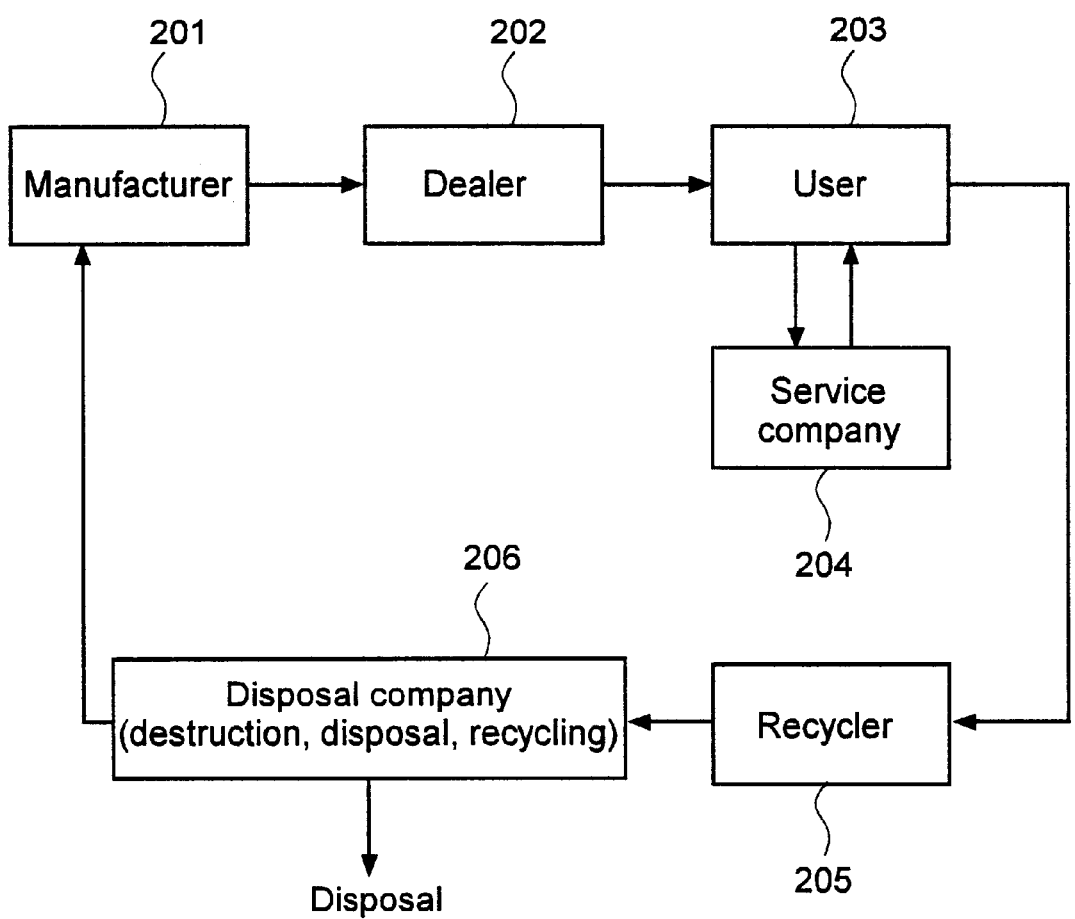
FIG. 2 is a drawing showing an example of a product life cycle managed by the life cycle management system.

FIG. 2 shows an example of a product life cycle managed by the product life cycle management system according to an embodiment of the present invention. The life cycle shown in FIG. 2 is similar to the product life cycle from the system shown in FIG. 1 but there is only one dealer 202 in FIG. 2 since the dealer and the retailer from FIG. 1 perform similar operations. Also, the recycling/recovery company from FIG. 1 is separated into a recycling company 205 and a disposal (disassembly, destruction, recycling) company 206. In FIG. 2, the product produced by the manufacturer 201 is sold to the user by the dealer 202. The user uses the product and, if repairs or maintenance is necessary, receives repair or maintenance services from the service company 204. Products that are to be destroyed are recovered by the recovery company 205 and are sent to the disposal company 206. At the disposal company 206, the IC tag information and information from the product life cycle management database are used to determine how the product is to be disposed. If the product or the parts thereof can be recycled, these are sent back to the manufacturer 201. If the product is to be destroyed, the determined method is used to destroy the product.

Figure 3:
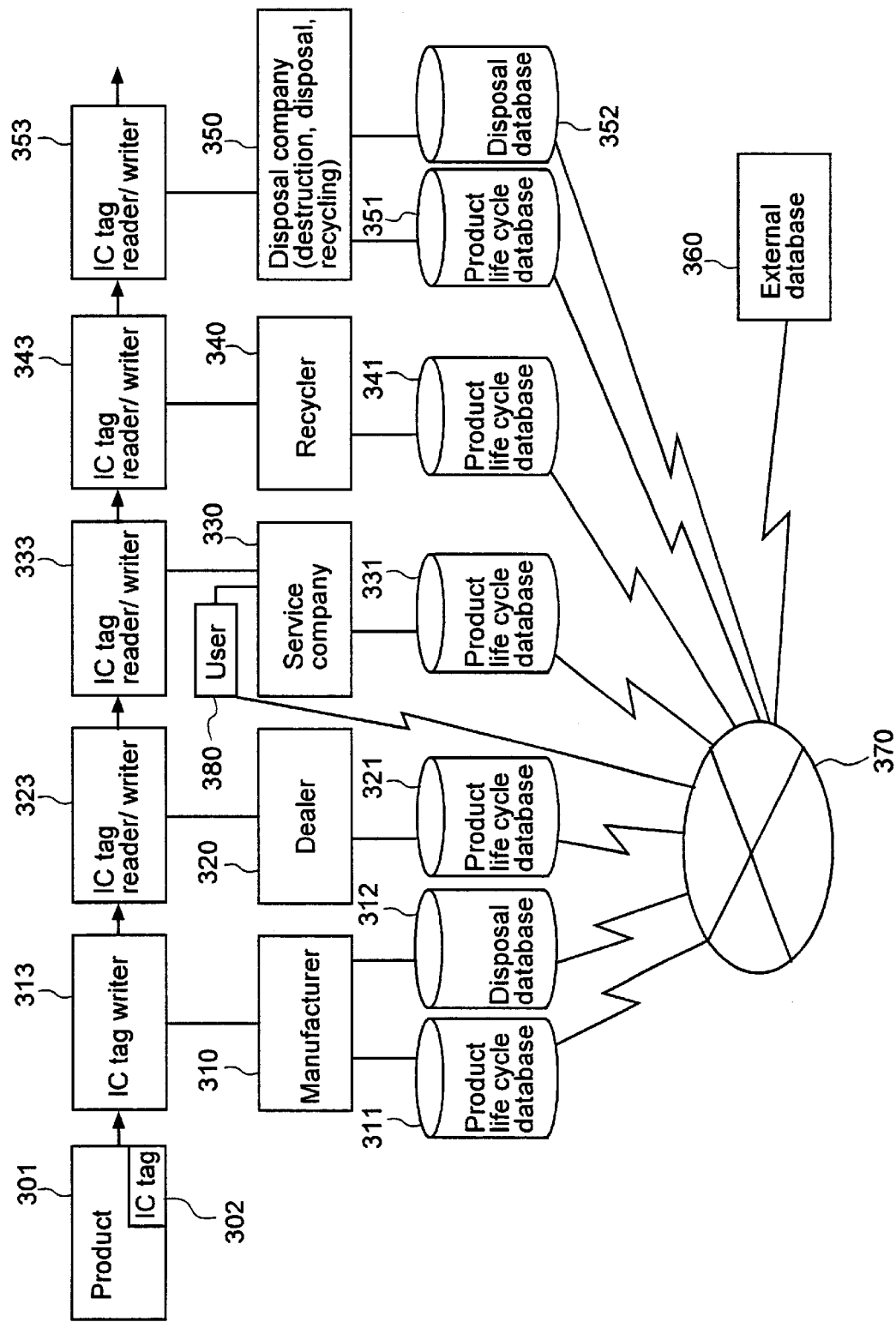
FIG. 3 is a block diagram of a life cycle management system used to manage to the life cycle of a product.

FIG. 3 is a block diagram of the life cycle management system used to manage product life cycles. In FIG. 3, an IC tag 302 is affixed to a product 301 produced at the manufacturer. The product 301 follows the life cycle shown in FIG. 2. As was described with reference to FIG. 1, various data needed for product life cycle management is written to or read from the IC tag 302 by an IC tag reader/writer 313 at a manufacturer system 310, by an IC tag reader/writer 323 at a dealer system 320, by an IC tag reader/writer 333 at a service company system 330, by an IC tag reader/writer 343 at a recovery company system 340, and by an IC tag reader/writer 353 at a disposal company system 350. The product sold by the dealer is used by the user 380 and, if necessary, maintenance or repair services are provided by the service company. While the user 380 is using the product, various usage conditions are measured and written to the IC tag.

Product life cycle databases 311, 321, 331, 341, 351 are provided at the systems 310, 320, 330, 340, 350, respectively, and these databases are connected via a network 370. As was described with reference to FIG. 1, various types of data needed for product life cycle management are written to and read from these product life cycle databases to provide unified data management.

Disposal databases 312, 353 are databases that store disposal regulations and the like, which are referred to when disposing (disassembling, destroying, recycling) the product 301. Normally, the information relating to specific standards and methods involved in destruction and recycling are concentrated at the manufacturer that produces the product or the disposal company that specializes in waste disposal and recycling. Therefore, disposal databases are provided in the manufacturer system 310 and the disposal company system 350 in this embodiment. An external database 360 is connected to the network 370. As with the disposal databases 312, 352, the external database 360 holds information relating to the regulations and methods involved in disposing products and parts (disassembly, destruction, recycling). For example, waste disposal methods change frequently due to changes in laws and technology. Since the disposal methods stored in the disposal databases 312, 352 are not necessarily up to date, the external database 360, which contains current information, is accessed. The external database 360 can be, for example, an Internet web page containing the current laws or a web page, put up by the manufacturer of the materials used in parts, that contains technical information about waste disposal methods.

Figure 4:
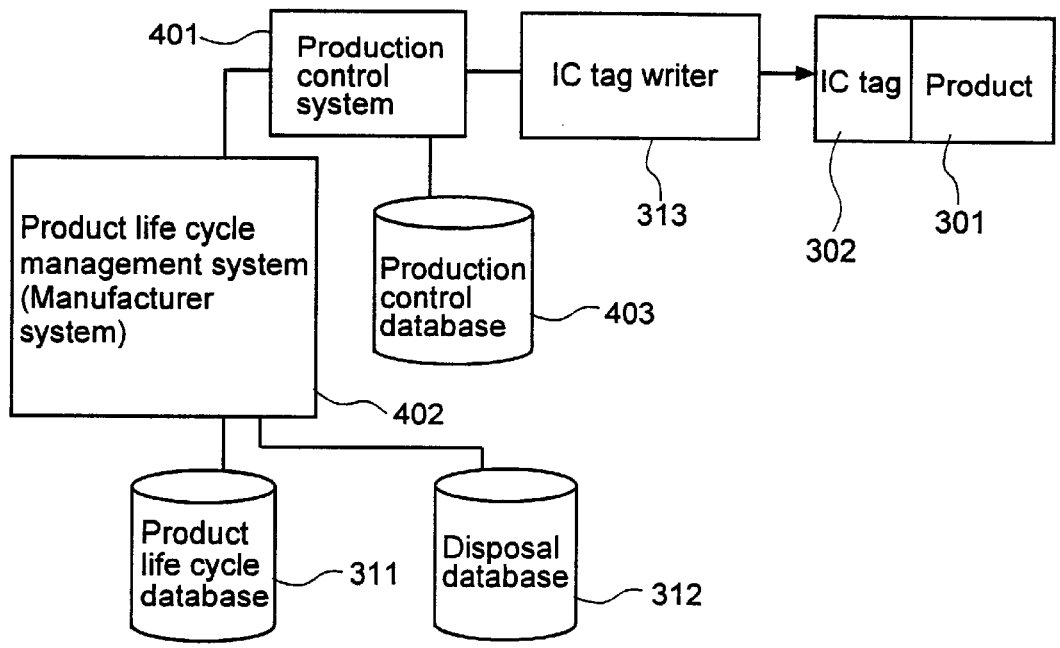
FIG. 4 is a block diagram showing a sample structure of a manufacturer system.

FIG. 4 is a block diagram showing a sample structure of a manufacturer system 310. The manufacturer system 310 includes a production management system 401, a product life cycle management system 402, and a production management database 403. The production management system 401 provides overall management of production. The production management database 403 is a database holding various types of data relating to production management such as product ID, product number, and part used in the manufactured products. The life cycle management system 402 is a system for managing product life cycles according to the present invention and writes prescribed information to an IC tag on the product 301 as well as to the product life cycle database 311.

FIG. 6A shows a memory map used in the memory of the IC tag 302. A storage area 600 of the memory in the IC tag 302 contains a product life cycle information storage area 601, a product information storage area 602, and a usage environment storage area 603.

FIG. 6B shows the contents of the information stored in the product life cycle information storage area 601. A site name and contact information is stored in the product life cycle information storage area 601. A site name field 604 contains identification information (ID) specifying the site reached by the product with the IC tag 302 (the manufacturer, the dealer, the service company, the recovery company). The contact information field contains information such as contact information for the site specified by the ID entered in the corresponding site name field.

FIG. 7 shows the contents of the information stored in the product information storage area 602. The product information storage area 602 includes a product ID area 701 and a part structure storage area 700. The product ID area 701 contains a product ID, which is an identifier used to specify individual products. The product ID can be, for example, a product number formed from the product model number and a number that can identify individual products.

The part structure storage area 700 stores information relating to the parts that make up the product. More specifically, the part structure storage area 700 includes storage areas for holding information relating to a part ID 702, an information 703 indicating whether or not reusable parts are used, an attribute information 704, an information 705 indicating whether the part is hazardous or not, a design change date 706, a repair/maintenance history 707, and a post-recovery disposal method 708. As shown in the example in FIG. 7, the part ID 702 is an ID that identifies parts so that the hierarchical relationships between parts can be determined. The information 703 indicating the use of reusable parts contains information that indicates whether the part identified by the corresponding part ID is a reused part. The attribute information 704 contains information relating to the attributes of the part such as the materials used in the part and weight. The information 705 indicating whether the part is hazardous contains information indicating whether destruction of the part is hazardous. If the design of a part is changed, the design change data 706 contains the data the part design was changed. If the design change date 706 is not set, it can be determined that there have been no design changes, and if the design change date 706 is set, it can be determined that there was a design change on the entered date. The repair/maintenance history 707 is an area used to store dates on which repair/maintenance was performed, information on the parts and the maintenance/repair work involved, and the part ID of replacement parts if parts were replaced. The post-recovery disposal method 708 contains entries such as disposal method A or disposal method B that indicate the post-recovery disposal method that should be used for the part. Details on these disposal methods can be obtained by accessing the disposal database described later. The post-recovery disposal method 708 can also be a URL (Uniform Resource Locator) indicating a location containing a disposal method entered in the external database 360. In this case, the external database can be accessed using this URL to obtain the current post-recovery disposal method. If a part is replaced with a different type of part, this fact is included in the repair/maintenance history 707, and the post-recovery disposal method 708 is also rewritten to indicate a new post-recovery disposal method for the part.

FIG. 6C shows the contents of the information stored in the usage environment storage area 603. Information indicating the actual environment/conditions under which the product is used is stored in the usage environment storage area 603. For example, a storage area 631 stores the number of times (or hours) and the temperature in which the product was used. A storage area 632 stores the number of times (or hours) and the voltage at which the product was used. A storage area 633 stores information such as the humidity, the number of hours used, the number of times used, and the number of times power was turned on and off.

Figures 8, 9:
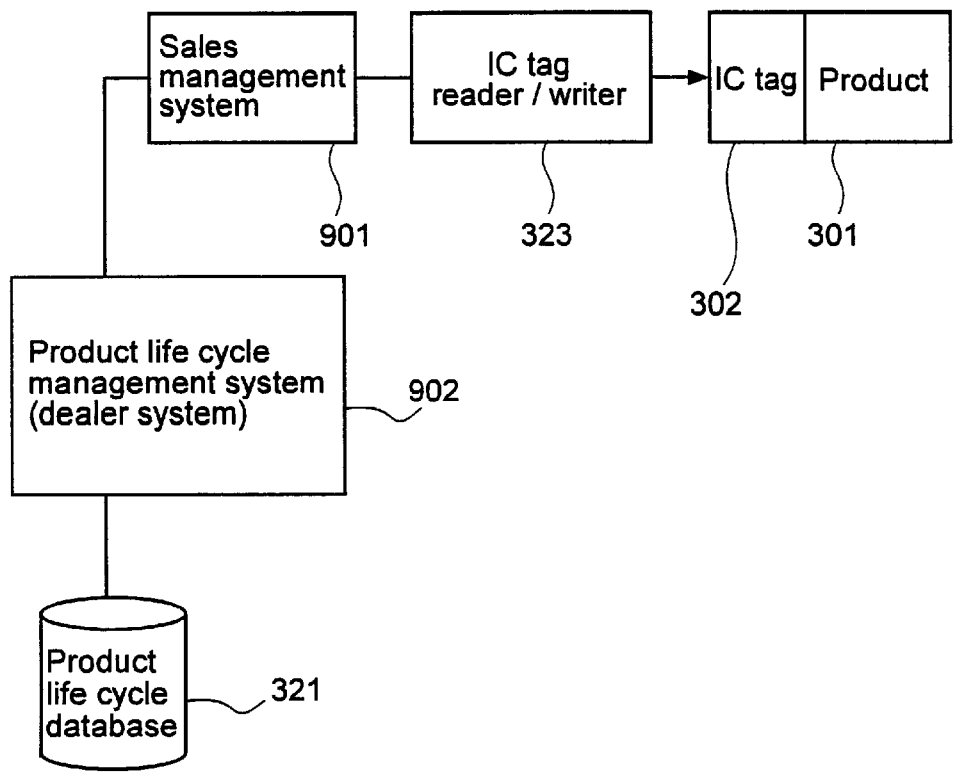
FIG. 8 is a drawing showing sample contents of a product life cycle database in a manufacturer system.
FIG. 9 is a block diagram showing a sample structure of a dealer system.

FIG. 8 shows the contents of the product life cycle database 311 installed in the manufacturer system 310. The product life cycle database 311 contains a product ID 801, a parts table 802, a manufacturer data 803, a shipping table 804, and a shipping destination 805. The product ID 801 is an ID that identifies individual products. The product table 802 contains information similar to the information stored in the parts structure storage area 700 of the IC tag 302.

Figure 5:
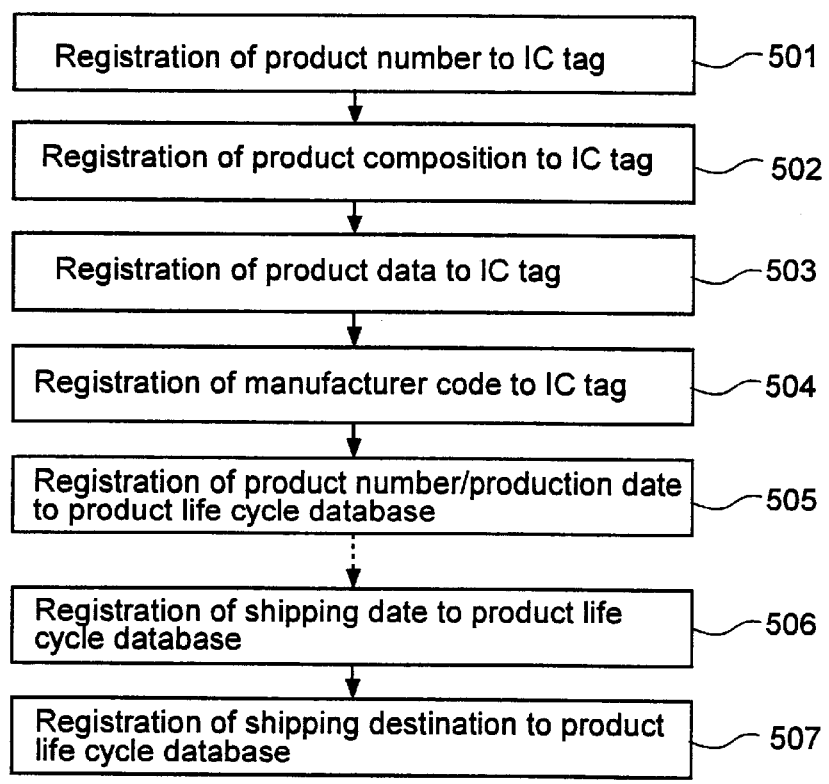
FIG. 5 is a flowchart showing a sample sequence of operations of the manufacturer system.

FIG. 5 shows a flowchart of the operations performed by the life cycle management system 402 of the manufacturer system 310 in order to manage the life cycle of a product. First, at step 501, the product number is entered in the product ID 701 of the IC tag 302 of the product. Then, at step 502, the life cycle management system 402 registers the parts structure information in the parts structure storage area 700 of the IC tag. At this stage, the repair/maintenance history 707 is left empty, while information about the product is written in other fields. At step 503, the manufacture date is entered in the IC tag 302. At step 504, the manufacturer code is written to the IC tag 302. More specifically, the manufacturer code entry involves writing a name (ID) indicating the manufacturer (site name) and contact information (address, telephone number, URL, e-mail address, and the like) to a first record 611 of the product life cycle information storage area 601. While not included in the figure, the manufacture date is stored along with the contact information in the first record 611 of the product life cycle information storage area 601. Next, at step 505, the life cycle management system 402 enters the product ID 801, the parts table 802, the and the manufacture date 803 into the product life cycle database 311. At step 505, the shipping date 804 is entered into the product life cycle database 311. At step 507, the shipping destination 805 is entered in the product life cycle database 311.

FIG. 9 is a block diagram showing a sample structure of the dealer system 320. The dealer system 320 includes a dealer management system 901 and a life cycle management system 902. The dealer management system 901 performs overall management of sales operations. The life cycle management system 902, which is a system for implementing product life cycle management according to the present invention, reads and writes information relating to the product 301, which is received and then sold, to the IC tag 302 and the product life cycle database 321.

FIG. 11 shows the storage contents of the product life cycle database 321 of the dealer system 320. The product life cycle database 321 includes a product ID 1101, an incoming shipping date 1102, a shipping source 1103, an outgoing shipping date 1104, and an outgoing shipping destination 1105.

FIG. 10A is a flowchart showing the operations performed by the life cycle management system 902 of the dealer system 320 when receiving incoming shipments of a product. When a shipment of a product comes in, the life cycle management system 902 enters the product ID 1101 into the product life cycle database 321 at step 1001. At step 1002, the incoming shipping date 1102 is entered in the product life cycle database 321. At step 1003, the incoming shipping source 1103 is entered in the product life cycle database 321. At step 1004, the life cycle management system 902 enters a dealer code in the IC tag of the received product. More specifically, the entry of the dealer code involves writing a name (code) of the dealer, which serves as a site name, as well as contact information to a record 612 in the product life cycle information storage area 601.

FIG. 10B is a flowchart showing the operations performed by the life cycle management system 902 of the dealer system 320 when shipping a product out. When a product is to be shipped out, the life cycle management system 902 enters the shipping date 1104 into the product life cycle database 321 at step 1011 and enters the shipping destination 1105 at step 1012.

Figure 12:
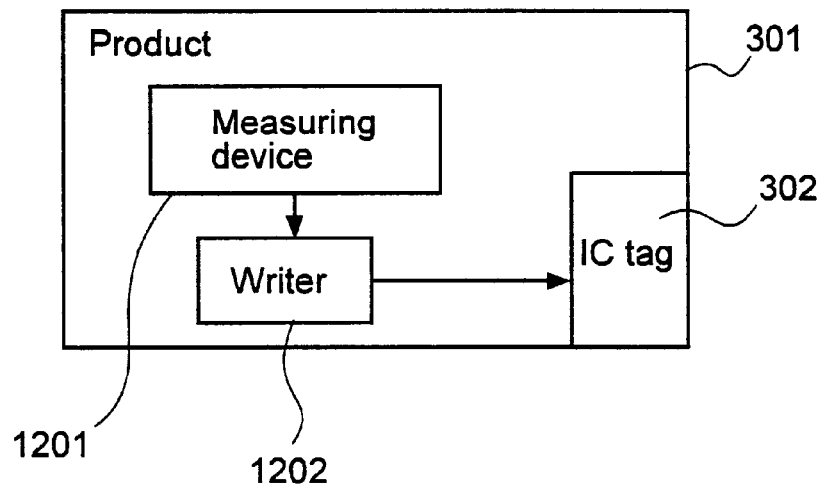
FIG. 12 is a drawing showing sample operations performed when a product is being used by a user.

The product sold by the dealer to the user is then used by the user. This product includes a feature whereby various usage conditions can be measured while the product is being used and written to the IC tag 302. FIG. 12 shows how this feature operates when the product is being used. This feature is implemented through a usage condition measurement device 1201 and a writer 1202 included in the product 301. When the product 301 is used, the usage condition measurement device 1201 measures various usage conditions. Usage conditions measured in this manner can include temperature, humidity, voltage, hours used, number of times used, and number of times power was turned on and off. These measurement results are written to a usage environment storage area 603 of the IC tag 302 by the writer 1202.

Figure 13:
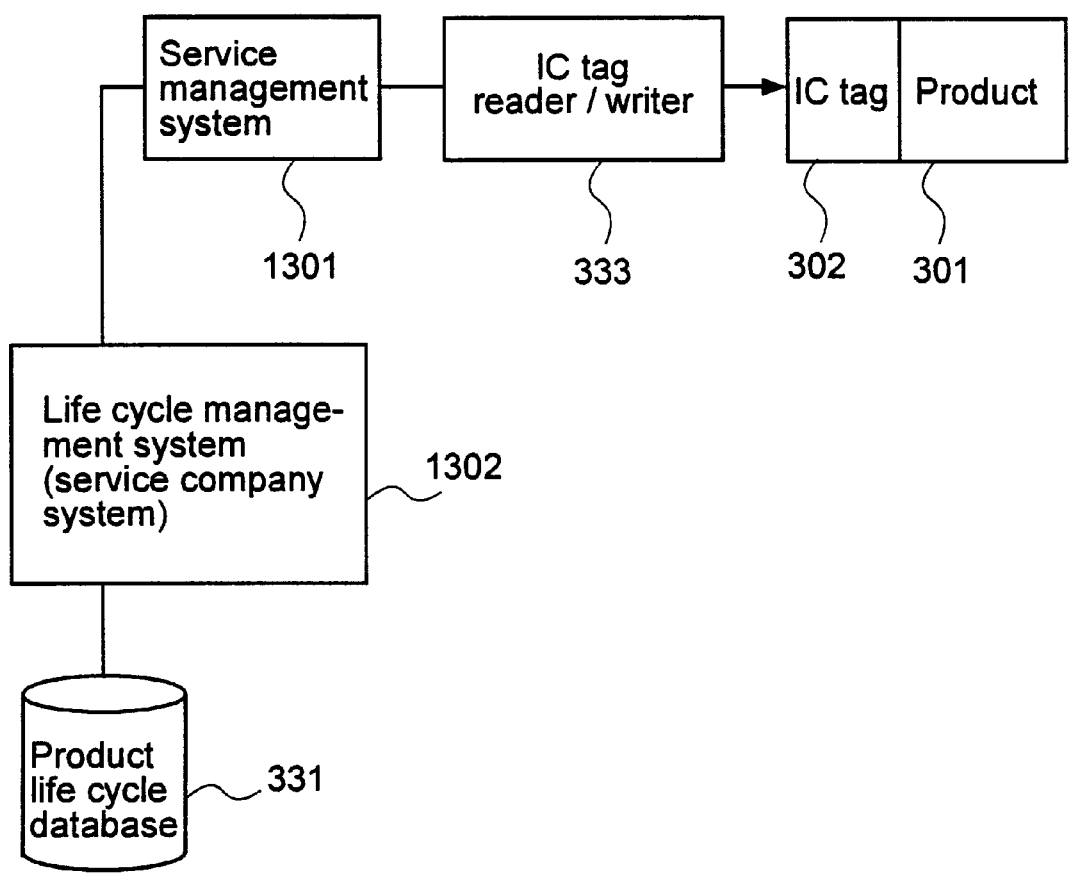
FIG. 13 is a block diagram showing a sample structure of a service company system.

If repair or maintenance is needed for the product being used by the user, a service company provides repair or maintenance services. FIG. 13 is a block diagram showing a sample structure of the service company system 330. The service company system 330 includes a service management system 1301 and a life cycle management system 1302. The service management system 1301 provides overall management of service operations at the service company. The life cycle management system 1302, which is a system implementing the product life cycle management according to the present invention, reads and writes information to and from the product life cycle database 331 and the IC tag 301 on the product 301 being repaired/maintained.

Figures 15, 16:
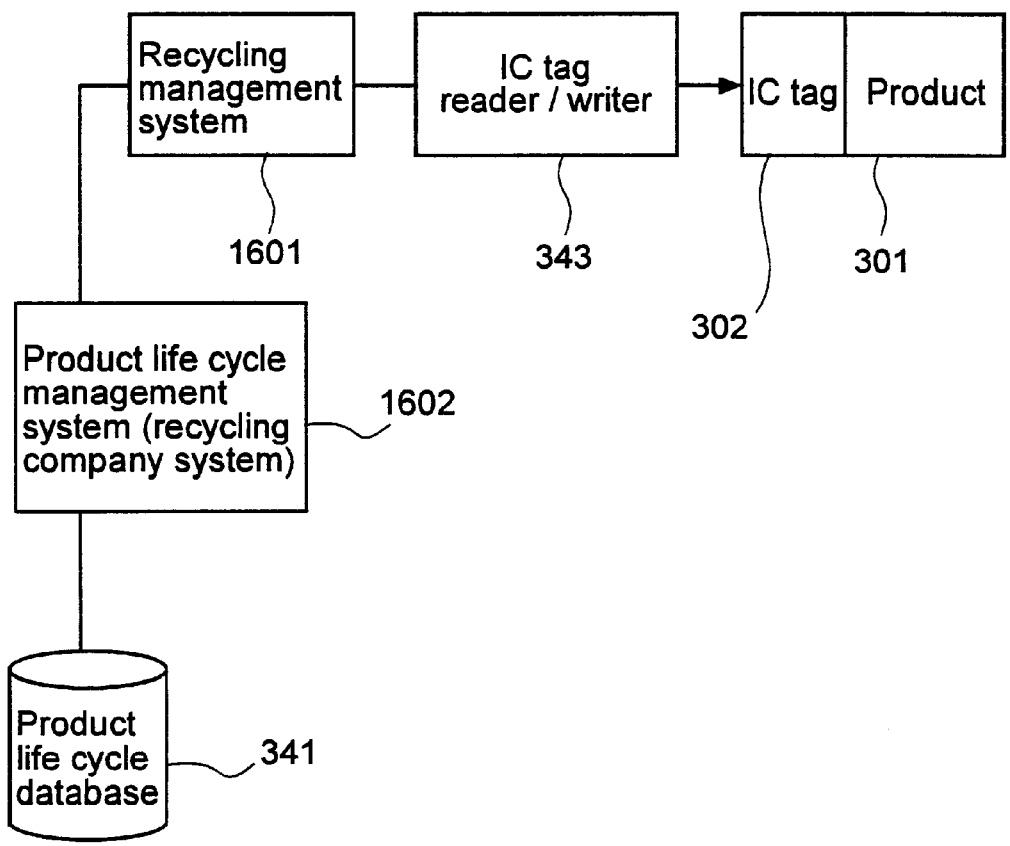
FIG. 15 is a drawing showing sample contents of a product life cycle database of a service company system.
FIG. 16 is a block diagram showing a sample structure of a recovery company system.

FIG. 15 shows the contents of the product life cycle database 331 of the service company system 330. The product life cycle database 331 stores a maintenance history information 1500. The maintenance history includes a product ID 1501, a service data 1502, and a detailed maintenance history 1502, including information of repairs and replacements.

Figure 14B:
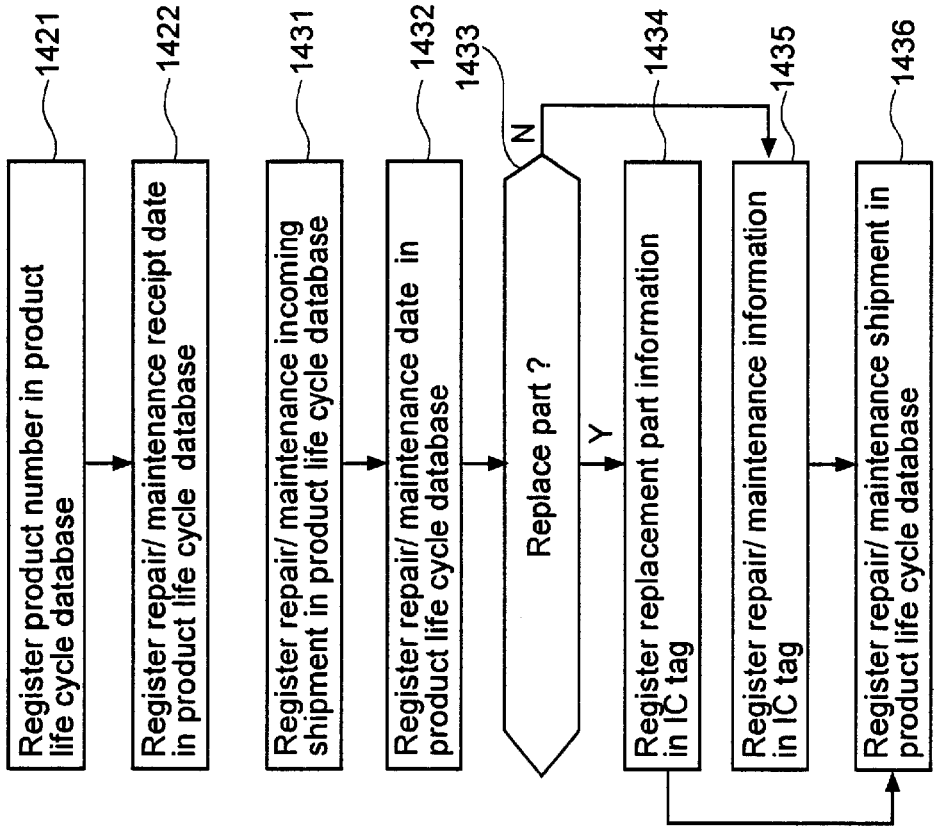
FIG. 14B is a flowchart showing the operations performed when recording service history to a product life cycle database in a life cycle management system of a service company system.
Figure 14A:
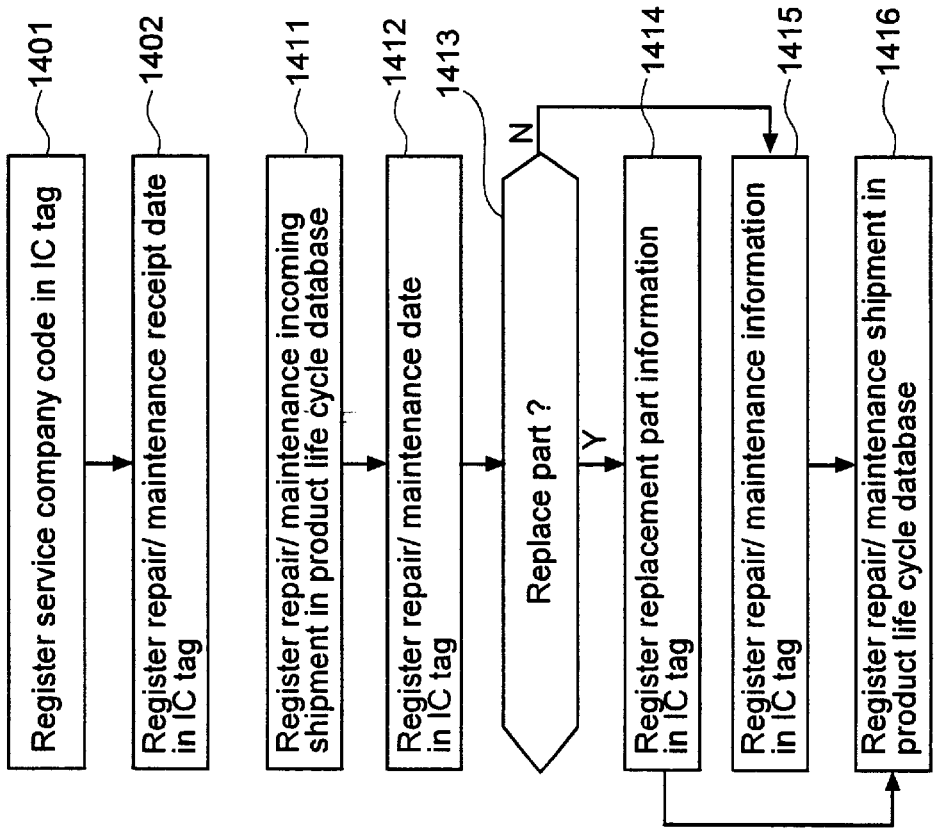
FIG. 14A is a flowchart showing the operations performed when recording service history to an IC tag in a life cycle management system of a service company system.

FIG. 14A is a flowchart showing the operations performed by the life cycle management system 1302 of the service company system 330 in recording service history to the IC tag 302 when a product is being serviced. The life cycle management system 1302 enters a service company code in the IC tag 302 of the product at step 1401. More specifically, the entry of the service company code involves entering a name (code) indicating the service company, which serves as the site name, as well as the contact information to the record 613 of the product life cycle information storage area 601 of the IC tag 302. At step 1402, the repair/maintenance receipt date is entered into the IC tag 302. In this case, the receipt date is entered into the contact information field of the record 613. When actual servicing is performed on the product, the incoming shipment of the repair/maintenance product is entered in the maintenance history 1500. At step 1412, the maintenance/repair date is entered in the contact information field of the life cycle information storage area 601 in the IC tag 302 attached to the product. The subsequent operations differ depending on whether or not the provided services included replacement of parts (step 1413). If the provided service involved the replacement of parts, information about the replaced parts is entered in the IC tag 302 at step 1414. More specifically, the information about replaced parts is written to the repair/maintenance history 707 in the parts structure storage area 700 of the IC tag 302. Then, the life cycle management system 1302 enters information about the outgoing shipment of the repair/maintenance product into the maintenance history 1500 of the product life cycle database 331. If the provided service did not include replacement of parts, repair/maintenance information is entered in the IC tag 302 at step 1415. More specifically, the repair/maintenance information is written to the repair/maintenance history 707 in the parts structure storage area 700 of the IC tag 302. Then, control proceeds to step 1416.

FIG. 14B is a flowchart of the operations involved in writing service history to the product life cycle database 331 when a product is being serviced in the life cycle management system 1302 of the service company system 330. At step 1421, the life cycle management system 1302 enters the product ID 1501 into the product life cycle database 331. At step 1422, the date on which the product received repair/maintenance is entered as a service date 1502 into the product life cycle database 331. When the product is actually serviced, the incoming shipment of the repair/maintenance product is entered in the maintenance history 1500 of the product life cycle database 311 at step 1431. At step 1432, the date on which repair/maintenance was performed is entered in the service date 1502 of the product life cycle database 311. In the service date 1502 field, both the date on which the product is accepted for repair/maintenance, and the date on which repair/maintenance was performed are entered. The operations performed next differ depending on whether the provided services included replacement of parts or not (step 1433). If the provided services included replacement of parts, part replacement information is entered in the IC tag 302 at step 1434. More specifically, information about the replaced part is written to the repair/maintenance history 707 in the parts structure storage area 700 of the IC tag 302. Then, at step 1436, the outgoing shipment of the repair/maintenance product is entered in the maintenance history 1500 field of the product life cycle database 311. If the provided service did not include replacement of parts, repair/maintenance information is entered in the IC tag 302 at step 1435. More specifically, the repair/maintenance information is written to the repair/maintenance history 707 of the parts structure storage area 700 in the IC tag 302. Then, control proceeds to step 1436.

FIG. 16 is a block diagram showing a sample structure of the recovery company system 340. The recovery company system 340 includes a recovery management system 1601 and a life cycle management system 1602. The recovery management system 1601 provides overall control over the recovery operations of the recovery company. The life cycle management system 1602, which is a system to implement product life cycle management according to the present invention, reads and writes information to the product life cycle database 341 and the IC tag 302 of the recovered product 301. When a product is recovered, the recovery company system 340 enters a recovery company code into the IC tag 302 of the product. More specifically, entry of the recovery company code involves writing the name (code) of the recovery company, which serves as the site name, as well as contact information to the record 614 in the product life cycle information storage area 601 of the IC tag. In this operation, the date on which the product was recovered is also written to the contact information field. Furthermore, the recovery company system 340 also enters the product ID of the recovered product, the recovery date, the outgoing shipping date, and the shipping destination (the disposal company) into the product life cycle database 341.

Figure 17:
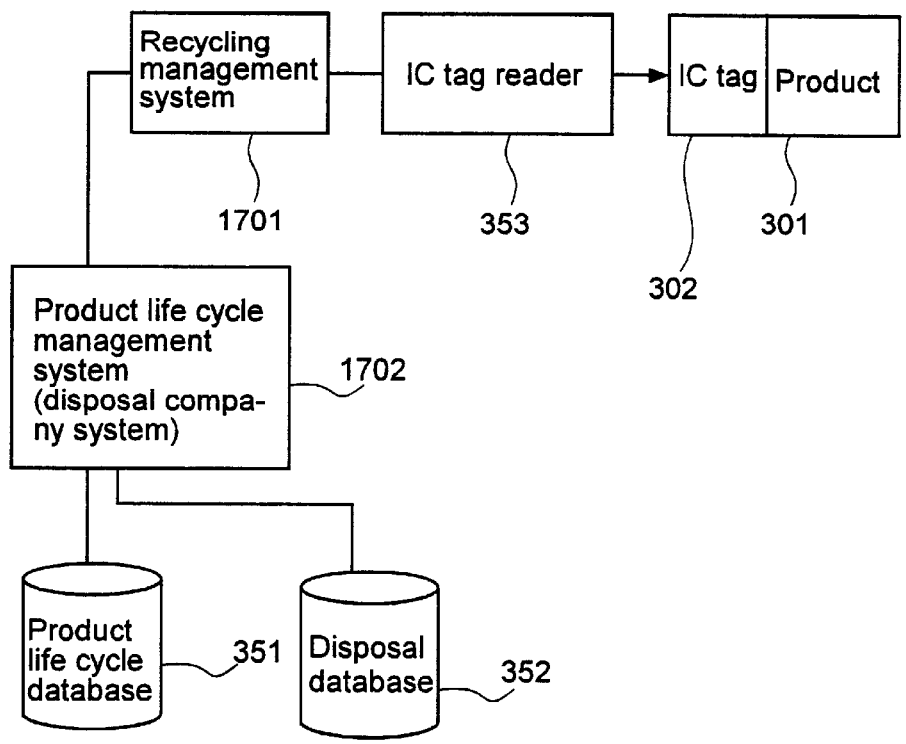
FIG. 17 is a block diagram showing a sample structure of a disposal company system.

FIG. 17 is a block diagram showing a sample structure of the disposal company system 350. The disposal company system 350 includes a disposal management system 1701 and a life cycle management system 1702. The disposal management system 1701 provides overall control over the disposal operations performed by the disposal company. The life cycle management system 1702, which is a system that implements product life cycle management according to the present invention, reads information stored in the IC tag 302 of the product 301 to be disposed and reads and writes information to and from the product life cycle database 351.

Figure 18:
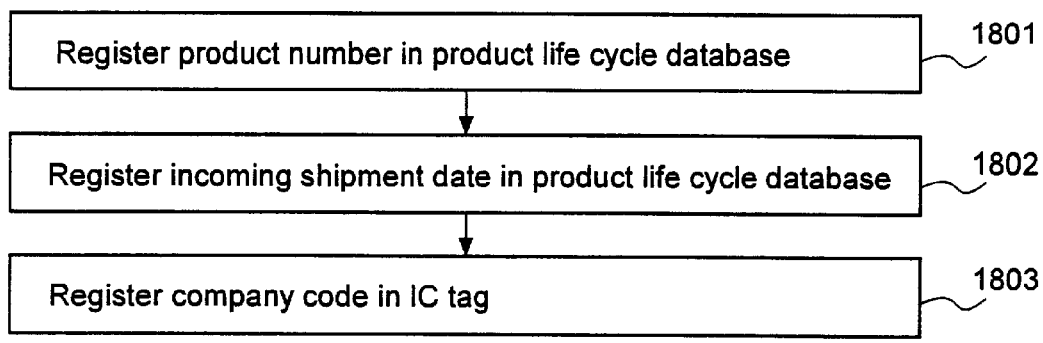
FIG. 18 is a flowchart showing the operations performed in a disposal company system.

FIG. 18 is a flowchart showing the operations performed by the disposal company system when a product is received. At step 1801, a product ID is entered in the product life cycle database 351. At step 1802, the incoming shipping date is entered. At step 1803, a disposal company code is entered in the IC tag 302 of the received product. More specifically, entering the disposal company code involves writing a name (code) indicating the disposal company, which serves as a site name, as well as contact information to the product life cycle information storage area 601.

Figure 19:
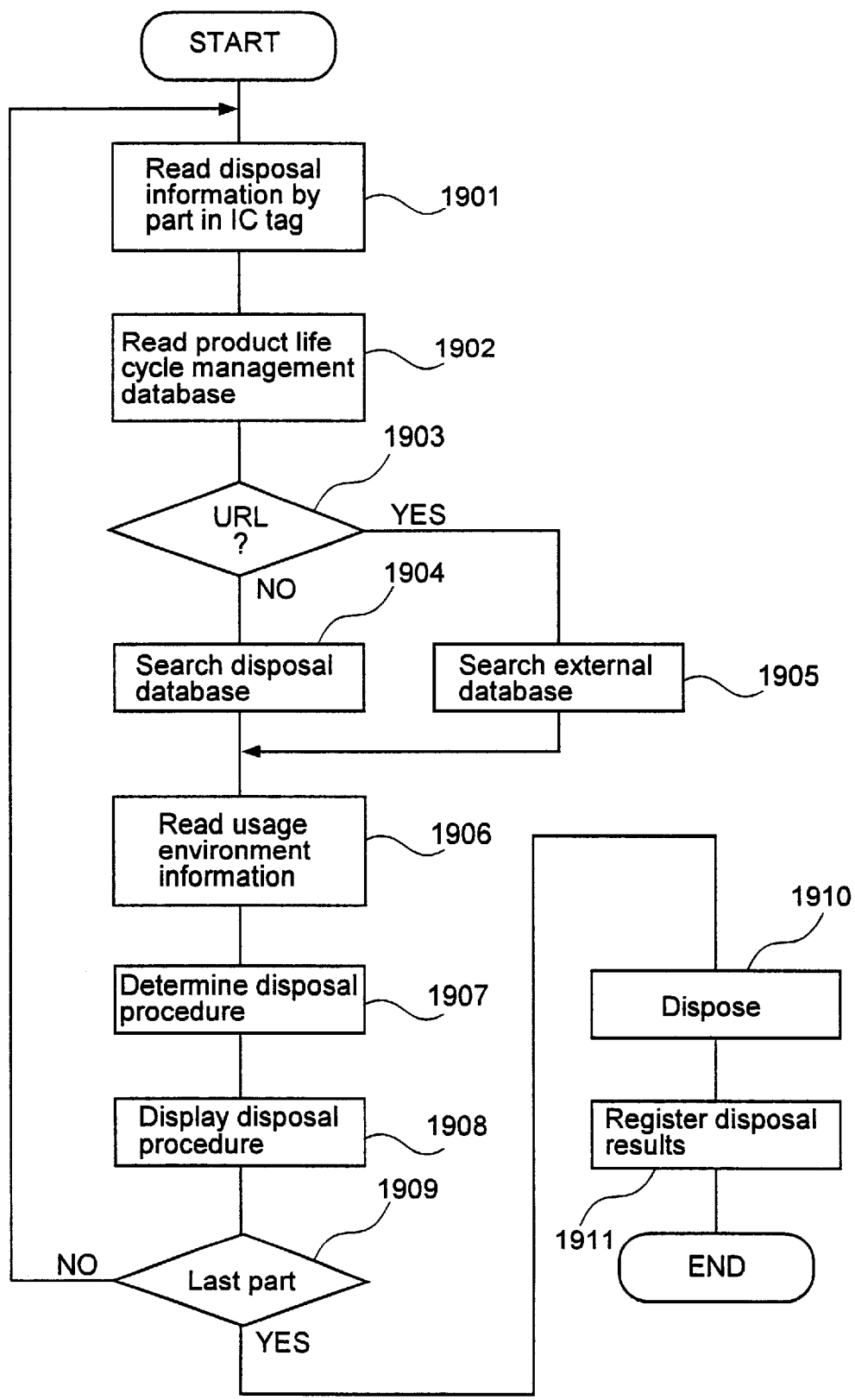
FIG. 19 is a flowchart showing the operations performed in a disposal company system.

FIG. 19 is a flowchart showing the operations performed on the product in the disposal company system. At step 1901, the disposal system 350 reads the post-recovery disposal method 708, which is organized by parts, from the product information storage area 602 of the IC tag 302 attached to the product 301. At step 1902, the disposal company system 350 acquires the post-recovery processing method for the product stored in the product life cycle database 311. At step 1903, the information acquired from the IC tag 302 and the product life cycle database 311 are checked to see whether they contain URLs. If the obtained information does not contain URLs, i.e., if the disposal methods are indicated as specific methods such as disposal method A, disposal B, then the disposal company system 350 searches the disposal databases 312, 352 at step 1904.

Figures 20, 21:
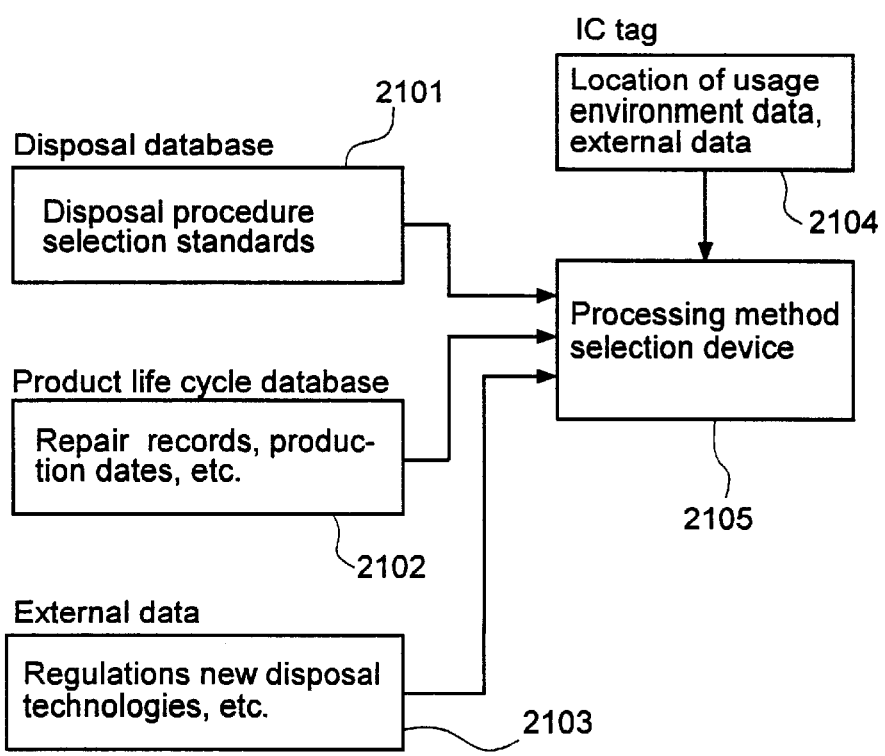
FIG. 20 is a drawing showing sample contents of a disposal database.
FIG. 21 is a drawing showing sample operations performed in selecting a disposal method.

FIG. 20 shows sample contents of disposal databases 312, 352. The disposal databases 312, 315 hold a disposal ID 3001 and corresponding disposal information. The disposal ID 2001 is an ID that specifies a disposal method stored in the post-recovery disposal method 708 such as disposal method A or disposal B. The disposal ID 2001 contains a detailed hierarchical structure for each disposal method. For example, if disposal is to be performed via disposal method A, the information in the IC tag and the product life cycle database are used to determine the specific method of disposal for each part. The details of the disposal method corresponding to each disposal ID is entered in the disposal contents field. The disposal contents field includes a disposal method 2002 and a disposal contents details 2003. The disposal method 2002 includes information indicating specific disposal methods such as recycling or destruction as well as URLs for referencing external databases. If the disposal method 2002 contains a URL, the URL is used to access an external database and obtain necessary information.

Returning to FIG. 19, the disposal company system 350 shows a disposal database at step 1904 and acquires detailed information about the specified disposal method. At step 1903, if the acquired information includes a URL, the URL is used to access an external database and detailed information about the disposal method is obtained, as with the disposal database (step 1905). Next, at step 1906, usage environment information is read from the usage environment storage area 603 of the IC tag 302. Then, at step 1907, this usage environment information is used to determine which disposal method is to be used for each part. For example, the disposal method for one part may be disposal method A, and the detailed information may indicate that this part can be recycled if it has been used for a certain number of hours or less and that otherwise the part must be destroyed. As shown in FIG. 20, the disposal database branches out below disposal method A to recycling and destruction based on usage time. The usage time is read from the usage environment information. The disposal database is accessed, and the disposal method is determined to be either recycling or destruction based on the usage time. Once the disposal method is determined at step 1907, the disposal method is displayed on a display device at step 1908. Next, at step 1909, an evaluation is made as to whether the current part is the last part for which a disposal method is to be determined. If not, control returns to step 1901 and the same operations are performed for the next part. If disposal methods have been determined for all the parts, control proceeds from step 1909 to step 1910, and the actual disposal operations such as disassembly and destruction are performed. Finally, at step 1911, the disposal results are entered in the product life cycle database 352.

FIG. 21 is a drawing for the purpose of describing how the disposal methods described above are selected. The selection criteria for the disposal methods are entered in the disposal database 2101. The product life cycle database 2102 contains information such as repair records. The external database 2103 contains regulations and new technologies relating to disposal. Based on this information as well as information from the IC tag 2104 attached to the product, a disposal method selection device 2105 determine a disposal method for each part.

The disposal of the product takes place as described above. Parts that are selected for recycling are sent back to the manufacturer to be reused. The IC tag 302 is taken off of the product and sent back to the manufacturer for reuse as well. The life cycle management information stored in the IC tag 302 and the product life cycle database are read and used for reliability analyses, marketing analyses, accounting of recovery expenses, and creation of manifests.

Figure 22:
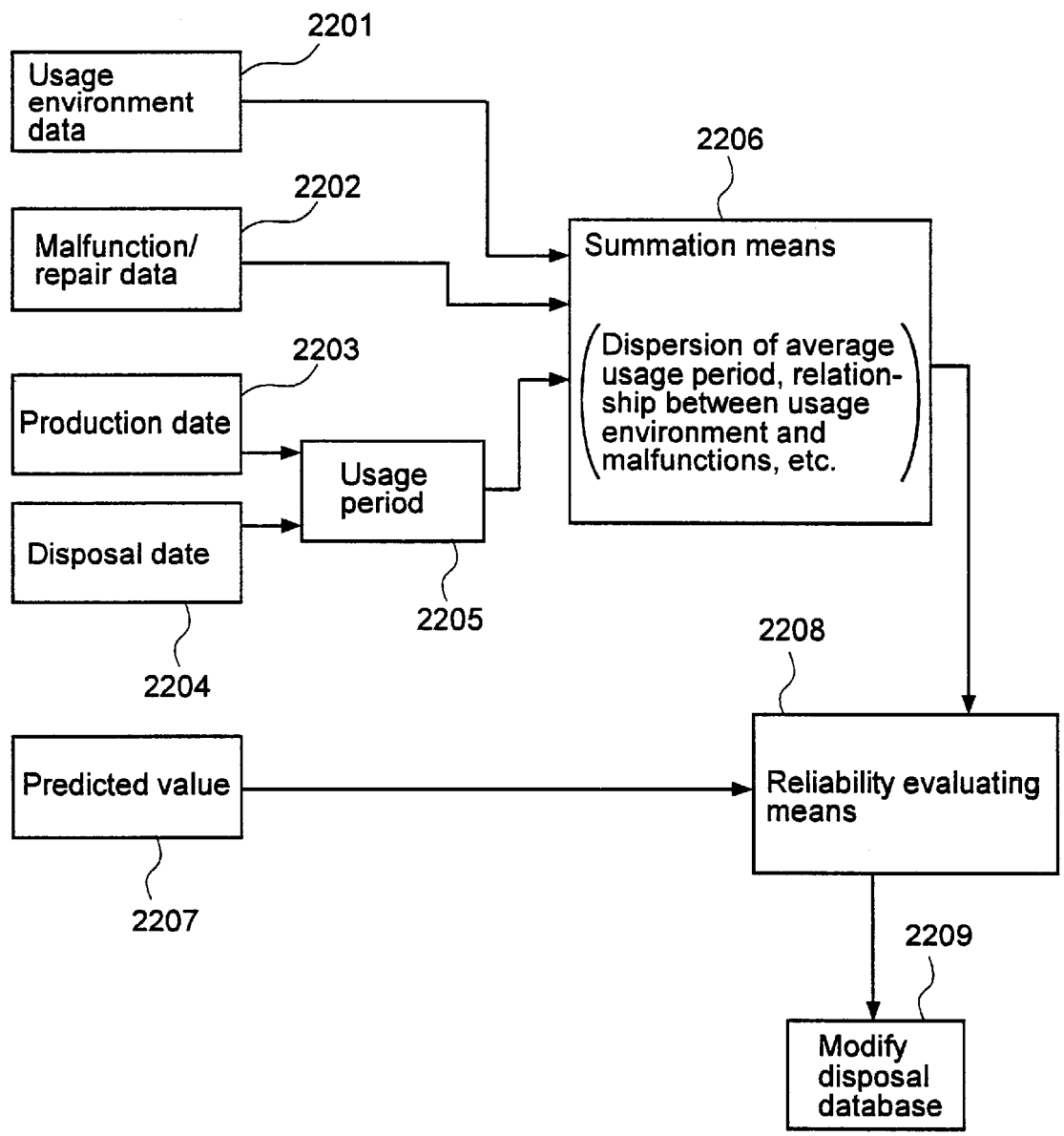
FIG. 22 is a drawing showing the operations performed in analyzing reliability based on information recorded in a product life cycle database and an IC tag.

FIG. 22 shows the operations used to perform a reliability analysis. Data 2201 through data 2204 are sample data read from the IC tag or the product life cycle database and are used for life cycle management. These data are tabulated by tabulating means 2206. A usage period 2205 is calculated from a manufacture date 2203 and a destruction date 2204. Tabulating means 2206 performs tabulation by looking at distribution of average usage periods, relationships between usage environment and malfunctions, and the like. Reliably evaluating means 2208 uses the processing results and design prediction values 2207 to evaluate the reliability of the product as well as each part. The results are reflected in the contents of the disposal database. For example, if it is found that a part is highly reliable and can be used for a longer period than the predicted value, the disposal database can be changed to raise the threshold value of the usage period for which the product can be recycled.

FIG. 23 shows sample contents of the accounting database when the IC tag and the product life cycle database are used to perform accounting of recovery expenses. An accounting database 2300 includes a disposal ID 2301, a disposal fee 2302, a purchase price 2303, and a different 2304. The disposal ID is an ID that specifies the disposal method for a product or part. For each disposal ID 2301, the expenses involved in disposal are entered in the disposal fee 2302 by company. Also, if these are parts that can be recycled, the purchase price is recorded in the purchase price 2303. The difference 2304 contains the balance of these figures.

Figure 24:
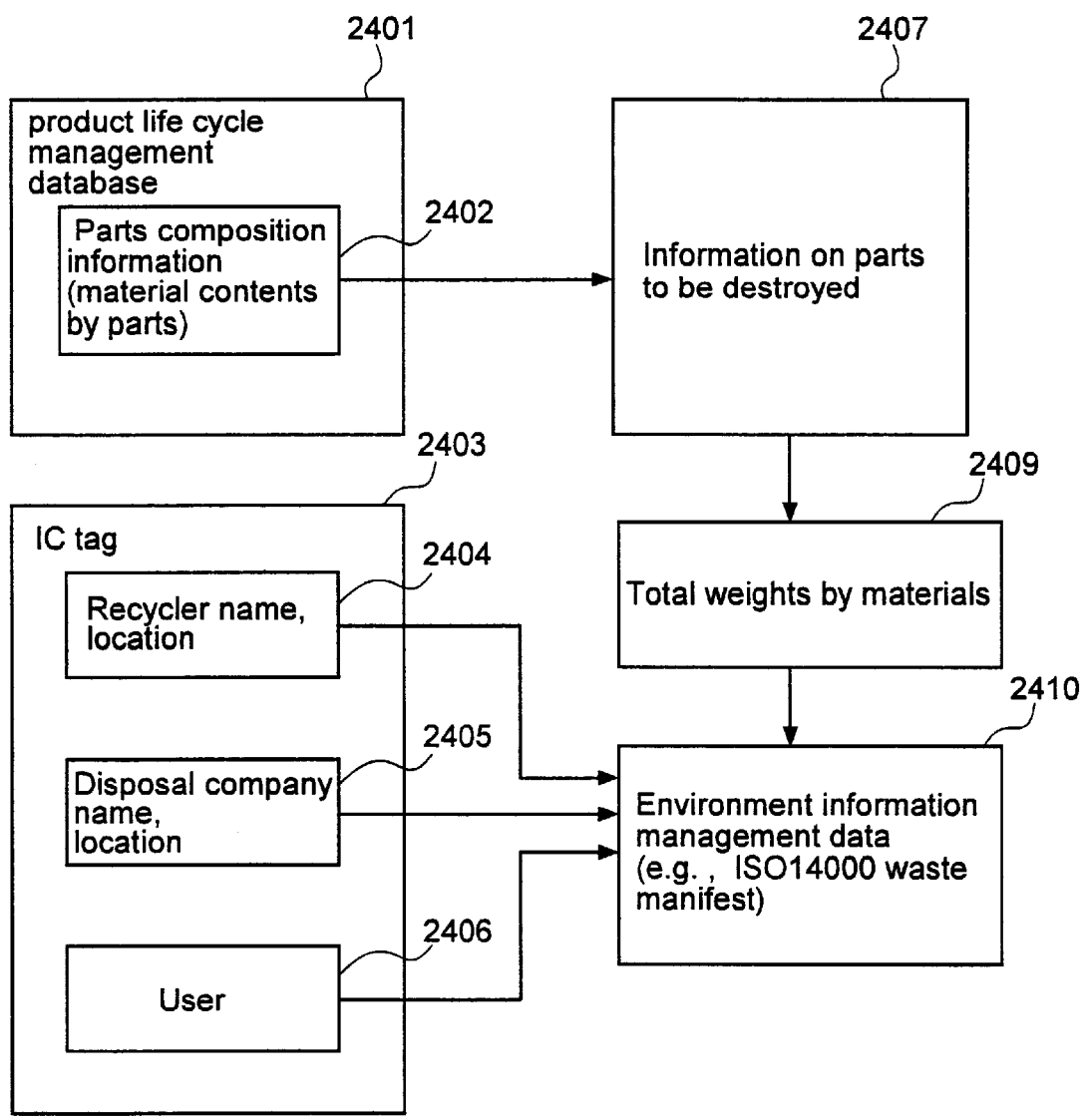
FIG. 24 is a drawing showing operations performed in creating environmental information management data based on information recorded in a product life cycle database and an IC tag.

FIG. 24 shows the operations involved in using information from the IC tag and the product life cycle database to create environmental information management data, known as a manifest, as defined in ISO14000. There is shown a data 2401 indicating the information stored in the product life cycle databases. This data includes a parts structure information 2402 containing information about the weight and materials of parts. A data 2403 indicates information stored in the IC tag and includes a retrieving company name and location 2404 and a disposal company name and location 2405. In this embodiment, the name and address of the user who disposed of the product is contained in the product life cycle database so this information can be read from the product life cycle database. However, it would also be possible to store information about the user in the IC tag and to read the user name and location from the IC tag, as shown in FIG. 24. An information about parts to be disposed 2407 can be obtained from the parts structure information 2402. Also, since the parts structure information includes the attributes (e.g., material, weight) of each part, a tabulation 2409 can be performed, organized by material, for the parts to be disposed. Furthermore, environmental information management data can be generated automatically by combining the IC tag data 2404–2406. Thus, it is possible to easily create a document or manifest based on ISO1400 standards.

In the embodiment described above, disposal methods are determined separately for each individual product. However, it would also be possible to determine the disposal method based on product model. Furthermore, in the description above, the contents and table structures used in the IC tag as well as the contents and table structures used in the various databases are examples, and the present invention is not restricted to these examples.

As described above, the present invention provides overall product life cycle management for all products, starting with manufacture of a product to its destruction or recycling. Thus, the present invention provides a life cycle management method, system, and product that allows rationalization of the disposal of products as well as the evaluation of whether a product or the parts thereof should be recycled or destroyed. In particular, the present invention attaches storing means such as an IC tag to each individual product, and various information (e.g., product type, presence of recycled parts, types and attributes of parts, destruction method of parts, sales route, repair/maintenance history) are stored in this storing means in order to perform life cycle management. Thus, no matter what stage in its life cycle a product is in, information about an individual product, such as product type, sales route, and maintenance history, can be determined by reading storing means. Also, additional repair information such as information about malfunctions and replaced parts can be written to storing means of an individual product, thus allowing the background of an individual product to be known. The information in storing means can also allow information such as when and from where the product was shipped out.

What is claimed is:

1. A life cycle managing method for managing a life cycle of a product from production to destruction comprising the steps of:

affixing a storage medium onto said product, said storage medium storing a product identifier uniquely identifying said product, a part ID of a part of said product and a URL indicating a location containing a disposal method of said part;

storing in said storage medium information relating to a product life cycle at each site that said product passes through during said life cycle; and performing destruction of said part based on said disposal method indicated by said URL recorded in said storage medium when said product is destroyed.

2. A life cycle managing method as described in claim 1 wherein said affixing step includes a step for storing information for determining a destruction method for said product in said storage medium.

3. A life cycle managing method as described in claim 2 further comprising a step for providing a disposal database accessible from at least a site where said destruction of said product is performed, said disposal database containing a destruction method for at least a portion of said parts in said product, said information for determining a destruction method for said product including information for accessing said destruction method stored in said disposal database.

4. A life cycle managing method as described in claim 3 wherein said step for performing said destruction includes:

a step for acquiring said information for determining a destruction method from said storage medium;

a step for acquiring said destruction method by accessing said disposal database using access information contained in said acquired information for determining a destruction method; and a step for destroying said product using said acquired destruction method.

5. A life cycle managing method as described in claim 2 wherein said step for performing said destruction includes:

a step for acquiring said information for determining a destruction method from said storage medium;

a step for determining a destruction method for said product based on said acquired information for determining a destruction method; and a step for destroying said product using said determined destruction method.

6. A life cycle managing method as described in claim 1 further comprising the steps of:

acquiring operating conditions of a product using means for measuring operating conditions disposed on said product; and recording information representing said operating conditions in said recording medium.

7. A life cycle managing method as described in claim 6 wherein said destroying step includes a step for determining a destruction method for said product using information representing said operating conditions recorded in said storage medium.

8. A life cycle managing method as described in claim 1 wherein said step for recording information about said life cycle includes a step for recording site information used to identify said sites in said recording medium.

9. A life cycle managing method as described in claim 1 wherein said step for recording information about said life cycle includes a step for recording information about said product passing through a site into a product life cycle database installed at said site.

10. A life cycle managing system for managing a life cycle of a product from production to destruction/recycling of said product comprising:

a storage medium affixed to said product and storing a product identifier uniquely identifying said product, a part ID of a part of said product and a URL indicating a location containing a disposal method of said part; and a plurality of management systems installed at sites involved in a flow of said product from production to destruction of said product and, as said product passes through a site, storing into said storage medium information about said site.

11. A life cycle managing system as described in claim 10 wherein said storage medium is an IC card storage medium allowing data to be read and written without contact.

12. A life cycle managing system as described in claim 11 wherein said information from the passage of said product through a site includes an identifier identifying said site.

13. A life cycle managing system as described in claim 11 further comprising a plurality of product life cycle databases installed in said plurality of management systems and storing information about the passage of said product through each site at which said management system is installed.

14. A life cycle managing system as described in claim 13 further comprising a network connecting said plurality of management systems.

15. A life cycle managing system as described in claim 14 wherein said storage medium includes, as information about said parts, information used to determine destruction or recycling methods for said parts.

16. A life cycle managing system as described in claim 15 further comprising:

a disposal database containing, for each of said parts contained in said product, information representing destruction or recycling methods for said parts; and said information in said storage medium used to determine said disposal method includes information for accessing said disposal database.

17. A life cycle managing system as described in claim 16 wherein said management system installed at said site where said product is destroyed or recycled includes means for acquiring information representing said disposal method stored in said disposal database by acquiring from said storage medium information for accessing said disposal database.

* * * * *